Sept. 30, 1947.　　　J. H. BLAKEMORE　　　2,428,138
COMBINED ARC WELDING AND CHIPPING TOOL
Filed Nov. 9, 1944
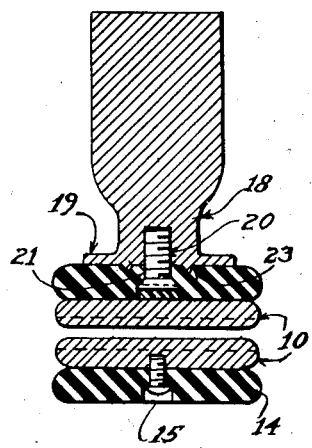
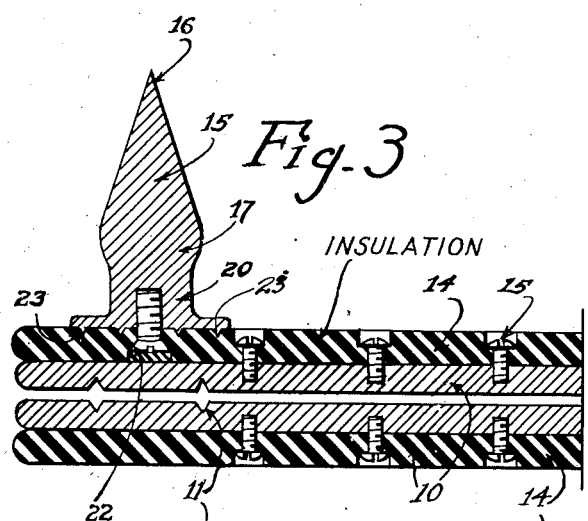
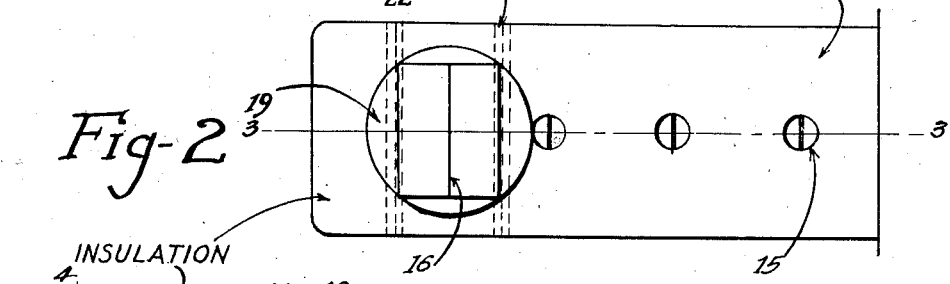
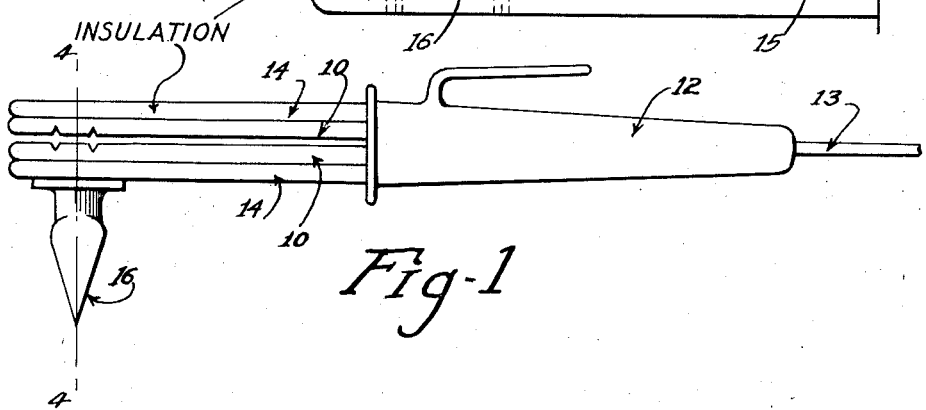
INVENTOR.
John H Blakemore
BY
Wilfred C Lawson
attorney Patented Sept. 30, 1947

2,428,138

UNITED STATES PATENT OFFICE 2,428,138

COMBINED ARC WELDING AND CHIPPING TOOL

John H. Blakemore, Chicago, Ill.

Application November 9, 1944, Serial No. 562,642

5 Claims. (Cl. 219—8)

This invention relates generally to the class of electric welding and has to do particularly with the provision of an improved chipping tool for use in chipping welds.

According to the present welding practice the welder has a chipping tool or hammer in addition to a welding tool or electrode holder, which he uses after completing a weld to chip off the slag. After completing a weld the welder must lay down the welding tool and pick up the chipping tool and after the chipping operation is completed, this tool is again laid aside and the welding tool is picked up to continue the welding operation. This procedure is time consuming and requires that the welder carry two separate tools with him as he moves along on a job or goes from one job to the other.

The present invention is designed to eliminate the foregoing difficulties by the provision of a welding tool or welding rod holder, having a chipping tool mounted thereon or forming a part thereof so that it is not necessary for the welder to lay down the welding tool after completing a weld, and pick up the separate chipping tool or hammer but it is only necessary for him to turn the welding tool to the proper position to bring the chipping hammer or tool into position for use.

In addition to the foregoing it is an object of the present invention to provide a novel means of securing or coupling a chipping tool to an electrode holder whereby the tool may be set at any desired angle for the convenience of the welder, thus making it possible for the welder, after completing a weld, to merely turn the tool by twisting his wrist, so as to bring the tool into the most convenient position for use.

The invention will be best understood from a consideration of the following detailed description, taken in connection with the accompanying drawing, forming a part of the specification, with the understanding, however, that the invention is not confined to a strict conformity with the showing of the drawing but may be changed or modified so long as such changes or modifications mark no material departure from the salient features of the invention as expressed in the appended claims.

In the drawing:

Figure 1 is a view in side elevation of an electric welding tool, shown without the electrode, with the present invention incorporated.

Figure 2 is a plan view of one side of the tool looking toward the edge of the attached chipping hammer.

Figure 3 is a sectional view taken substantially on the line 3—3 of Figure 2.

Figure 4 is a sectional view taken substantially on the line 4—4 of Figure 1.

Referring now more particularly to the drawing, the numeral 10 designates the usual copper jaws of a welding tool, between which the weld rod or electrode is gripped in the opposing transversely extending grooves 11.

The handle of the welding tool is designated 12 and the electric current conducting cable which passes through the handle to the jaws 10, is designated 13.

In accordance with the present invention the outer sides of the jaws 10, which are flat, have secured thereto the bars or plates 14 of insulation material. The plates are here shown as being secured by countersunk screws 15 which pass through the plates and into tapped openings in the jaws but it is to be understood that any suitable means may be provided for attaching the insulation plates to the jaws.

The numeral 16 generally designates the chipping tool which is shaped somewhat like a chisel, having the broad relatively sharp edge 16, formed at one end while at the opposite end it is relatively thick as indicated at 17 and this thickened portion merges with the shank 18 which in turn is formed integrally with the plate 19.

Formed through the plate and centrally of the shank 18, is a threaded or tapped hole 20 which is designed to receive the securing screw 21 which secures or fastens the chipper to the outer side of one of the insulating plates 14, close to the free end thereof.

The plate 14 to which the chipper tool is attached, has formed therethrough the countersunk opening 22 which is designed to have the screw 21 extended therethrough from the inner side and to have the head of the screw countersunk below the inner surface of the insulation plate so that such screw will not come into electrical connection with the adjacent electrode or jaw 10.

By the provision of the single screw for securing the chipper tool to the electrode, it will be readily seen that the tool can be placed at any desired angle or in other words the tool can be adjusted so that the cutting edge 16 is at any desired angle across the jaw of the welding tool. Thus the welder can set the chipper in the position which is the most convenient for him to use.

In order to maintain the chipping tool against turning around the securing screw 21 after the tool has been attached, the top surface of the plate 19 is provided with a number of teeth or spurs 23. These will bite into the insulation body 14 against which the plate is drawn by the screw and thus hold the chipper against turning.

From the foregoing it will be readily seen that by the provision of the insulation plate 14 which is secured to the electrode holding jaw and the attachment of the chipping tool to the insulation plate, there is no danger of an arc being formed when the chipping tool comes into contact with the metal upon which it is used.

The advantages of the present tool are that it combines in a single tool, a chipping hammer and an electrode holder, thus giving the welder one less tool to handle or manage, and its use in welding eliminates the need for laying down the electrode holder, picking up the chipping hammer, laying down the chipping hammer and picking up the holder each time the weld must be chipped, since the welder holds both tools combined in one, in his hand.

By means of the present invention, much confusion and work is eliminated, allowing the welder to accomplish more work with less effort than heretofore. In addition, the cost of producing the combination tool will obviously be a great deal less than that for producing separate tools.

The advantage of the present combination tool to the welder will be readily appreciated when it is recalled that it is frequently necessary for the welder to hold himself in position with one arm while using the other hand for the manipulation of the welding tool and the chipping tool. Consequently, the welder is able to avoid having to make many movements due to the fact that he does not have to lay down one tool and pick up another and consequently there is much greater safety in using a single combined tool such as that here disclosed, than in using two separate tools alternately.

I claim:

1. The combination with an electrode holder of an electric arc welding tool, of a chipping hammer, and means for securing the chipping hammer to the electrode holder in electrically insulated relation with the holder, the said securing means for the chipping tool being designed to facilitate the setting of the tool with the working edge of the tool at any desired prescribed angle with respect to the electrode holder.

2. The combination with the electrode holder of an electric arc welding tool, comprising a body of insulation material secured to the holder, a chipping hammer having a cutting edge at one end and having a neck extending from the opposite end, a single securing screw extending through the body of insulation material and longitudinally into said neck, and means forming a part of the neck for attachment to the insulation material to maintain the chipping tool against turning on the securing screw relatively to the body of insulation.

3. The combination with the electrode holder of an electric arc welding tool, comprising a chipping hammer having a cutting edge at one end and having a shank portion extending longitudinally from the other end, the shank portion being integral with a plate lying in a plane perpendicular to the length of the shank, a body of insulation material secured to the electrode holder and having a flat face against which said plate positions, the shank having a tapped hole therein for the reception of a securing screw, a securing screw passing through the body of insulation material into said tapped hole to draw the plate and shank into firm connection with the body of insulation material, and spur members carried by that face of the plate opposing the body of insulation material, for engagement in such material to maintain the plate and the chipping hammer against turning on the screw relatively to the insulation material.

4. In an implement of the character stated including a handle and a pair of metallic arms extending therefrom and designed to function as a clamping means, a body of insulation material overlying one face of an arm, a chipping tool secured to said body of insulation, the tool comprising a solid, relatively long metallic body tapered at one end to form a cutting edge, the opposite end of the body being flattened to form an attaching plate, the attaching plate bearing against the body of insulation material and maintaining the tool in a position in which the cutting edge is directed away from the body of insulation material, and means carried by the body of insulation material and extending into said metallic body to secure the latter to the insulation material.

5. An implement as set forth in claim 6, wherein the said securing means enters the body of insulation material upon the longitudinal center thereof, and spurs carried by said plate and engaging in the body of insulation to prevent the plate from turning on the securing means.

JOHN H. BLAKEMORE.

REFERENCES CITED

The following references are of record in the file of this patent:

UNITED STATES PATENTS

| Number | Name | Date |
|---|---|---|
| 1,825,314 | Heckman | Sept. 29, 1931 |
| 2,104,750 | Jones | Jan. 11, 1938 |
| 2,213,306 | Del Bene | Sept. 3, 1940 |
| 2,327,290 | Rice | Aug. 17, 1943 |